May 20, 1930. W. RABSILBER 1,759,417
ELECTRICAL CORD SUPPORT
Filed March 23, 1927
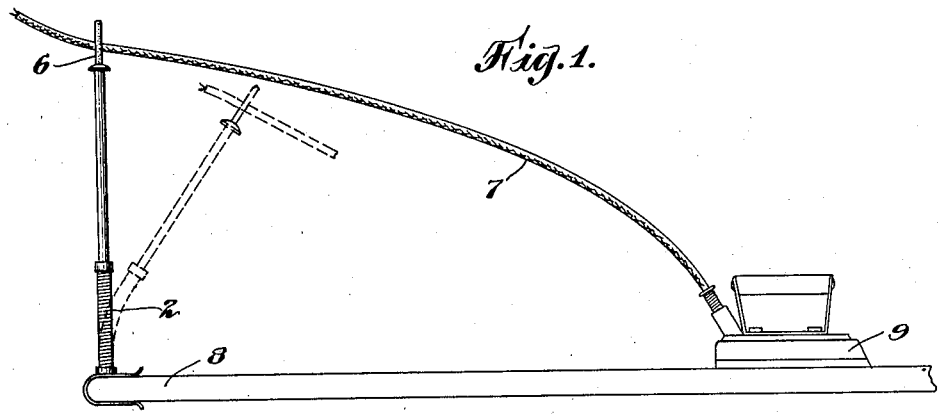
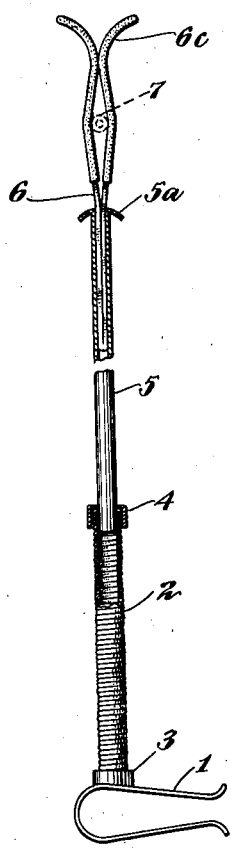
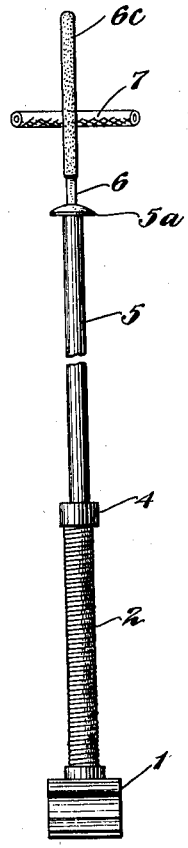
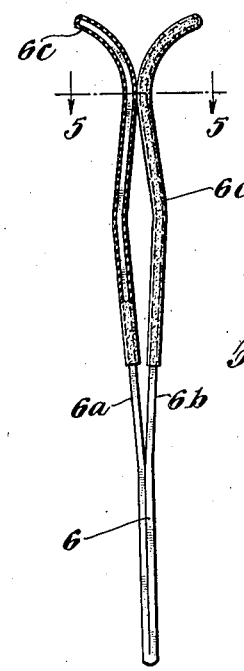
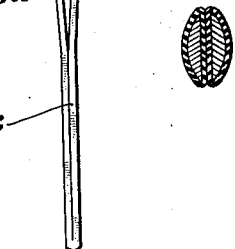
INVENTOR
William Rabsilber.
BY Joseph Amon
ATTORNEY Patented May 20, 1930

1,759,417

UNITED STATES PATENT OFFICE

WILLIAM RABSILBER, OF NEW YORK, N. Y., ASSIGNOR TO CLARA ROBERTS, OF NAUGATUCK, CONNECTICUT

ELECTRICAL CORD SUPPORT

Application filed March 23, 1927. Serial No. 177,640.

My invention relates to improvements in electrical cord supports, and the objects of this invention are as follows:

1. To provide suitable flexible supporting means so arranged as to hold the connecting cord of electrical devices in a suspended position.

2. To arrange such a cord supporting means so as to permit the electrical device to be moved about in any desired direction without interference or entangling the connecting cord.

3. To provide flexible means to permit the cord support to follow the movements of the cord under tension in any direction or position of the electrical device.

4. To provide means whereby the cord support may be easily and quickly attached or detached to or from any table, board or other suitable working surfaces.

5. To provide removable arranged, electrically insulated rotating cord gripping means for the purpose of securely holding the cord in position and at the same time permit any desired angular displacement.

6. To design the device in such simple and efficient manner as to permit its production in large quantities at the possibly lowest cost.

These and other objects I attain by the novel combination of various parts and elements fully described in this specification and illustrated in the accompanying drawing in which:

Figure 1 represents an illustration of a practical application of an electrical cord support, embodying the features of my invention, in combination with an electric iron.

Figure 2 represents a partly sectional view of such an electrical cord support.

Figure 3 represents a side view of Figure 2.

Figure 4 represents an enlarged view showing the details of the rotating cord grip.

Figure 5 represents a sectional view of Figure 4, along lines 5—5 in Figure 4.

It is a well known fact that the connecting cords leading to electrical devices are invariably entangling themselves with other objects or even with the device itself, thus not only causing annoyance but very often serious damages. To overcome these objectionable features I have devised a flexible supporting means embodying numerous novel features.

This support as illustrated in Figure 2, comprises a sturdily designed gripping or holding spring 1, so shaped as to firmly grip and hold upon a table or board as illustrated in Figure 1. A preferably coiled and flexible spring 2, securely joined to holding spring 1, by means of a cup shaped socket 3, while a similar socket 4, is joining the upper portion of coil spring 2 to a tubular supporting member 5, the upper portion of which is formed into a flange 5ª, the purpose being to conveniently lead the cord gripping member 6, into the tubular member 5. The cord gripping member 6, shown in detail in Figures 4 and 5 comprising a suitably shaped gripping spring so folded as to form two branches or prongs 6ª and 6ᵇ. These prongs 6ª and 6ᵇ are so arranged as to press towards each other under considerable tension, the purpose being to securely grip and hold the cord 7 of the electrical device. Insulating coverings or sleeves 6ᶜ, furnish ample electrical protection for the connecting cord 7. The lower part of cord gripping member 6, is dimensioned to permit this member to easily rotate within sleeve member 5, thereby permitting connecting cord 7 to follow any horizontal angular displacement of the electrical device.

Figure 1 illustrates a practical application of this flexible cord support. Holding spring 1 tightly grips the ironing board 8, upon which the electric iron 9 is operated. Connecting cord 7 is firmly held between prongs 6ª and 6ᵇ, of cord gripping member 6, thus holding the connecting cord 7 in a suspended position at all times. Now in case the electric iron is moved beyond its predetermined limit the tightened cord 7 will exert a pull upon the gripping member 6 and by necessity cause the flexible coil spring 2, to yield and follow the motion, as clearly indicated in dotted lines in Figure 1.

In my experiments I have found that the type of flexible coil spring 2 is most suitable for the purpose but I wish to make it understood that practically any type of coil or flat spring, or even a soft rubber rod or tube may be satisfactorily employed and operate, the main object being to interpose a yielding flexible member between the cord gripping member and the holding member.

Having thus fully described my invention I do not wish to limit myself to the exact details as shown, it being apparent that there may be considerable variations in its application within the spirit of my invention.

What I claim as new and desire to secure by Letters Patent is:

1. In a device of the character described, the combination of a detachable and rotatably arranged fork shaped flexible cord-gripping member, an elongated tubular receptacle member for said fork shaped flexible cord-gripping member, a suitable fastening member arranged to permit the attaching or detaching of the device to or from a suitable operating base, and a pliable coil shaped bending member securely and permanently held in position between said elongated tubular receptacle member and said fastening member, substantially as and for the purpose set forth.

2. In a device of the character described, the combination of a detachably and rotatably arranged fork shaped flexible cord gripping member, suitable insulating means provided upon the prongs of said fork shaped flexible gripping member, an elongated tubular flanged receptacle member to receive and movably support said fork shaped flexible cord gripping member, a flexible fastening member arranged to permit the attaching or detaching of the device to or from any suitable base, a pliable bending member securely and permanently held in position between said elongated tubular receptacle member and said flexible fastening member, and suitable sockets for the purpose of joining said pliable bending member to said elongated tubular receptacle and said flexible fastening member respectively.

Signed at the city of New York, in the county and State of New York, this 16th day of March, A. D. 1927.

WILLIAM RABSILBER.